United States Patent
Tibbett (12)

(10) Patent No.: US 6,195,100 B1
(45) Date of Patent: Feb. 27, 2001

(54) METHOD AND SYSTEM FOR RENDERING BRUSH STROKES WITH MULTIPLE NIBS

(75) Inventor: Steve Tibbett, Ottawa (CA)

(73) Assignee: Corel Corporation (CA)

( * ) Notice: Subject to any disclaimer, the term of this patent is extended or adjusted under 35 U.S.C. 154(b) by 0 days.

(21) Appl. No.: 09/123,159

(22) Filed: Jul. 27, 1998

(30) Foreign Application Priority Data

Jul. 28, 1998 (CA) .................................................. 2243816

(51) Int. Cl.⁷ .................................................. G06T 11/40
(52) U.S. Cl. .......................................... 345/429; 345/469
(58) Field of Search ..................................... 345/429, 469

(56) References Cited

U.S. PATENT DOCUMENTS

| | | | |
|---|---|---|---|
| 5,155,813 | 10/1992 | Donoghue et al. ................... | 395/275 |
| 5,182,548 | 1/1993 | Haeberli ................................ | 340/706 |
| 5,239,292 | 8/1993 | Willan .................................. | 340/709 |
| 5,347,620 | 9/1994 | Zimmer ................................ | 395/129 |
| 5,432,896 | 7/1995 | Hwong et al. ........................ | 395/129 |
| 5,534,893 | 7/1996 | Hansen, Jr. et al. ................. | 345/179 |
| 5,687,304 | 11/1997 | Kiss ...................................... | 395/119 |
| 5,847,712 | * 12/1998 | Salesin et al. ....................... | 345/430 |

FOREIGN PATENT DOCUMENTS 2169627   5/1995   (CA) .............................. G06T/11/00

OTHER PUBLICATIONS

"Non Interactive Graphics" John Lewell; 1985 Software Patent Institute Database of Software Technologies; pp. 1–3.

* cited by examiner

Primary Examiner—Mark R. Powell
Assistant Examiner—Motilewa Good-Johnson
(74) Attorney, Agent, or Firm—Hayes, Soloway, Hennessey, Grossman & Hage, P.C.

(57) ABSTRACT

A method and system are provided for rendering a brush stroke with multiple nibs which are added to a center point indicated by a cursor, and the position and movement of each nib are controlled based on variables which can be set by a user. The variables include a number of nibs to be rendered in the brush stroke, initial position values determining an initial position of each nib relative to a center point, and movement variables representative of movement of each nib relative to the center point. A current position of the center point is determined relative to the document. A new position for each nib is calculated, relative to the current position of the center point, based on the initial position values and the movement variables. A dab is rendered at the new position of each nib. By repeating the steps of determining a current position, calculating a new position and rendering a dab while the center point is being moved, a brush stroke of unique painting effect is rendered.

32 Claims, 4 Drawing Sheets

FIG. 10

METHOD AND SYSTEM FOR RENDERING BRUSH STROKES WITH MULTIPLE NIBS

This invention relates to a method and system for rendering brush strokes on electrical documents, and more particularly, to a method and system for rendering brush strokes using multiple nibs to provide unique paint effects.

BACKGROUND OF THE INVENTION

There are many paint systems or applications which can render brush strokes on electrical documents in computer graphics systems. Brush strokes are drawn as a cursor is moved by a cursor moving device such as a mouse or a pen drawn over a pen tablet.

In many systems, a brush dab is comprised with a single nib. The size and shape of the brush nib may be changed by a user to render different brush strokes. However, in many systems, once a particular size and shape of the brush nib are selected, they are unchanged along a brush stroke.

In some systems, a nib shape is varied during a brush stroke. U.S. Pat. No. 5,155,813 issued on Oct. 13, 1992 to Donoghue et al discloses a computer apparatus for brush styled writing. A pen tablet is sampled to generate smooth brush strokes in real time to facilitate accurate calligraphy. U.S. Pat. No. 5,239,292 issued on Aug. 24, 1993 to Willan discloses how positional input from a graphics tablet is used to determine the position and some characteristics including nib shapes. However, those systems render only a single nib for a brush stroke.

Other paint systems can draw multiple nibs while a mouse is being moved. However, the positions of the multiple nibs are either fixed or simulated random. In impressionist clone systems, multiple nibs are provided at fixed positions. U.S. Pat. No. 5,347,620 issued on Sep. 13, 1994 to Zimmer refers to multiple dabs being rendered for each brush position. The position of the extra strokes is randomly generated to achieve the effect of a bristled brush.

There are many systems to simulate calligraphy, but no system has been proposed to render a brush stroke having a unique painting effect using multiple nibs.

It is therefore desirable to provide a paint system which can render a brush stroke with multiple nibs whose movement is controllable to provide unique painting effects.

SUMMARY OF THE INVENTION

An object of the present invention is to provide a method and system for rendering a brush stroke with multiple nibs whose movement is controllable to provide unique painting effects.

To this end, the present invention provides multiple nibs in addition to a centre point indicated by a cursor, and controls the position and movement of each nib based on variables which can be set by a user. As the centre point is moved, the variables are incremented, and a dab is rendered at a new position of each nib determined by the incremented variables. Thus, the present invention provides brush strokes that are significantly different from traditional brush strokes.

In accordance with an aspect of the present invention, there is provided a method for rendering a brush stroke on an electrical document. The method is started by setting a number of nibs to be rendered in the brush stroke, setting initial position values determining an initial position of each nib relative to a centre point, and setting movement variables representative of movement of each nib relative to the centre point. Then, a current position of the centre point is determined relative to the document. A new position for each nib is calculated, relative to the current position of the centre point, based on the initial position values and the movement variables. A dab is rendered at the new position of each nib. By repeating the steps of determining a current position, calculating a new position and rendering a dab while the centre point is being moved, a brush stroke is rendered.

In accordance with another aspect of the present invention, there is provided a brush stroke rendering system for rendering a brush stroke on an electrical document. The system comprises an initial setting unit, a centre point position determining unit, a nib position calculating unit and a display controller. The initial setting unit allows setting of a number of nibs to be rendered in the brush stroke, initial position values determining an initial position of each nib relative to a centre point, and movement variables representative of movement of each nib relative to the centre point. The centre point position determining unit determines a current position of the centre point relative to the document. The nib position calculating unit calculates each nib position based on the initial position values and the movement variables, relative to the current position of the centre point determined by the centre point position determining unit. Then, the display controller renders a dab at each nib position calculated by the nib position calculating unit.

BRIEF DESCRIPTION OF THE DRAWINGS

The invention will be further understood from the following description with reference to the drawings in which:

FIG. 10 is an example of a brush stroke rendered in accordance with the embodiment of the present invention shown in FIG. 5.

DETAILED DESCRIPTION OF THE PREFERRED EMBODIMENTS

In accordance with the present invention, each brush dab that is potentially drawn to render a brush stroke is comprised of multiple nibs added to a centre point indicated by a base position of a cursor or a mouse pointer on an electrical document. A position of each additional nib is calculated based on a mathematical algorithm that determines a particular arrangement for the nibs relative to the centre point at the start of a brush stroke. As the centre point is moved, each nib position is varied based on a number of settings so that the arrangement of the nibs changes to generate a unique painting effect. The user can change the settings to obtain different painting effects.

Figure 1:
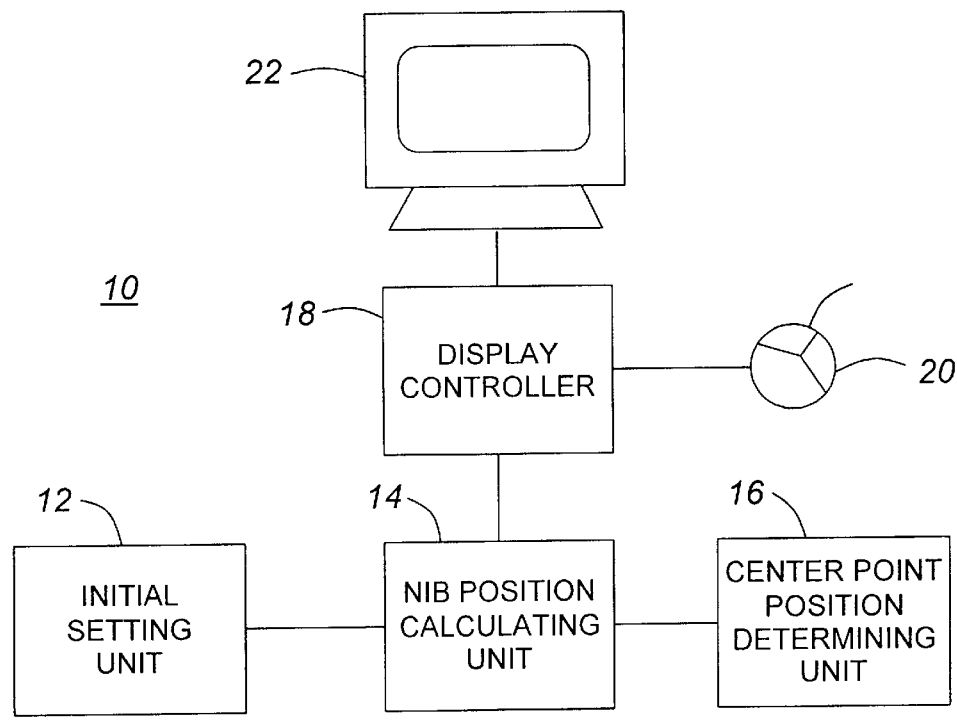
FIG. 1 is a block diagram showing a brush stroke system in accordance with an embodiment of the present invention.

Referring to FIG. 1, an embodiment of a brush stroke rendering system 10 for rendering a brush stroke on an electrical document in accordance with the present invention is described. The system 10 comprises an initial setting unit 12, a nib position calculating unit 14, a centre point position determining unit 16 and a display controller 18. The display controller 18 receives input signals from a cursor moving device, such as a mouse 20, and controls a display device 22. Instead of the display device 22, a printer or other outputting device may also be used.

The initial setting unit 12 allows a user to set initial settings. The initial settings include a number of nibs to be rendered in a brush stroke, initial position values determining an initial position of each nib relative to a centre point, and movement variables representative of movement of each nib relative to the centre point.

The nib position calculating unit 14 is connected to the initial setting unit 12 so that it can access the initial settings. It is also connected to the centre point position determining unit 16 which determines, relative to the document, a current position of a centre point indicated with a cursor displayed on the display 22 by the display controller 18.

The nib position calculating unit 14 calculates each nib position based on the initial settings set by the initial setting unit 12 and the current position of the centre point determined by the centre point position determining unit 16.

In response to the nib position calculating unit 14, the display controller 18 renders a dab at each calculated nib position.

By moving the centre point using the mouse 20, multiple dabs are rendered at calculated nib positions and a brush stroke is rendered.

The initial setting unit 12 may also allow a user to set inclusion or exclusion of a centre point in a brush stroke. The size of each nib may also be set using the initial setting unit 12.

Figure 2:
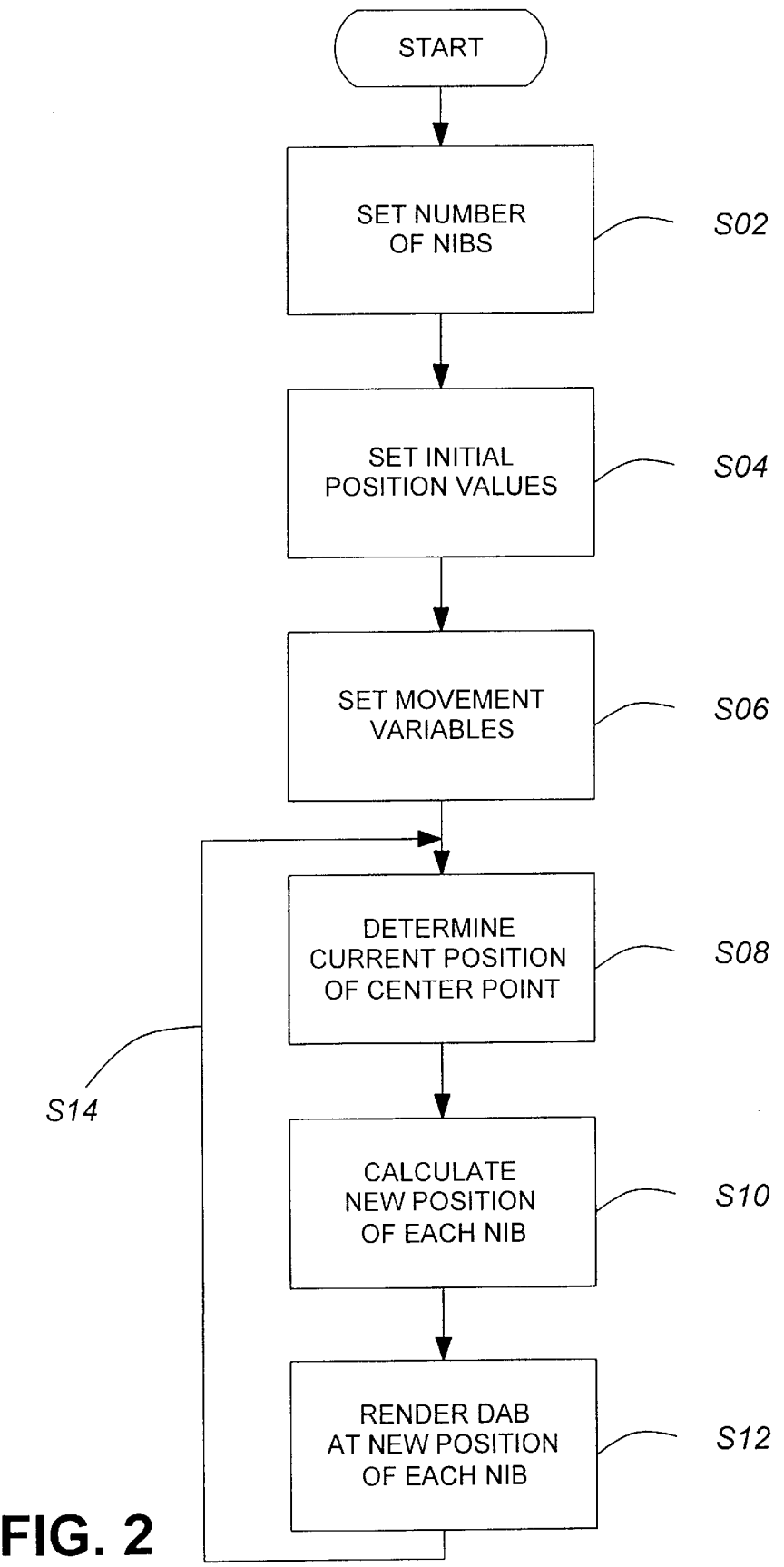
FIG. 2 is a flowchart showing a method of rendering a brush stroke in accordance with the embodiment of the present invention.

FIG. 2 shows the operation of the brush stroke system 10. Rendering a brush stroke on an electrical document starts by setting a number of nibs to be rendered in the brush stroke (S02), setting initial position values (S04), and setting movement variables (S06).

As a brush stroke is about to be rendered, when the brush stroke system is enabled, the system determines a current position of the centre point relative to the document (S08), and calculates a new position for each nib, relative to the current position of the centre point, based on the position variables and the movement variables (S10). Then, the system renders a dab at the new position of each nib (S12).

As the centre point is moved, the system increments the values of movement variables with each dab for the current position of the centre point by repeating the steps of S08 to S12 (S14) until the brush stroke is terminated.

Figure 3:
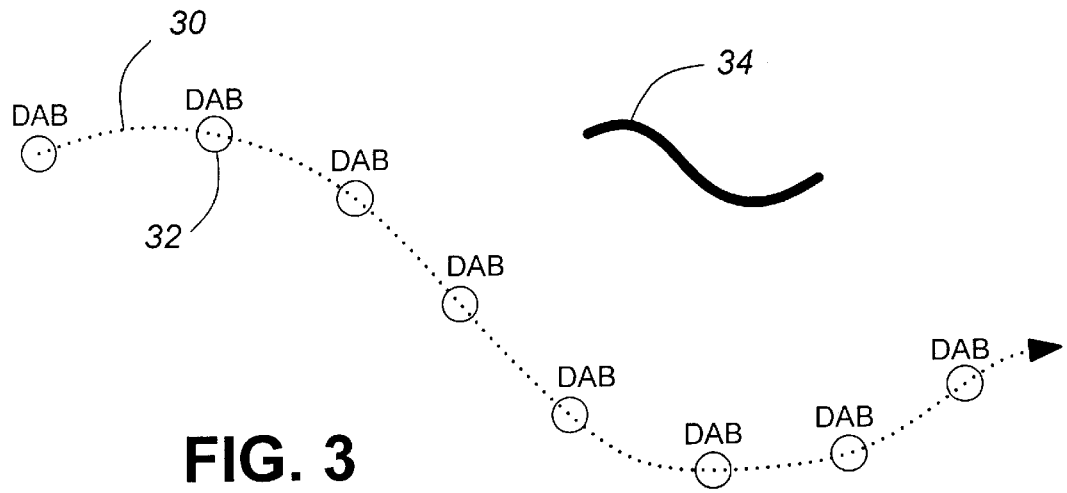
FIG. 3 is a schematic diagram showing an example of positioning of dabs.

As shown in FIG. 3, it is preferable to repeat the steps S08 to S12 such that, for normal centre point or mouse pointer movement 30, dabs 32 are placed close enough that the dabs 32 overlap to create a smooth image 34.

It is convenient to define each nib position using a radius and an angle relative to the centre point.

The radius is a value determining how far from the centre point each nib will be placed. The initial radius values of the nibs determine the initial size of the brush dab effect.

Figure 4:
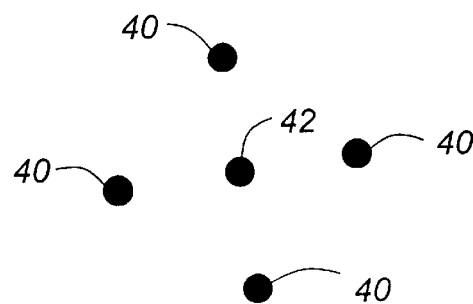
FIG. 4 is a schematic diagram showing an example of arrangement of nibs.

The multiple nibs added to the centre point may be arranged symmetrically or radially around the centre point. FIG. 4 shows an example of arrangement of nibs in which four nibs 40 are arranged symmetrically and radially around a centre point 42.

When all nibs are arranged equidistantly in a circular pattern around the centre point, the system needs only a radius and a base angle which is an angle of a first nib relative to the centre point to arrange all nibs because the angles of other nibs can be calculated based on the base angle and the number of the nibs. The base angle may start at zero for each brush stroke.

The movement variables may comprise a rotation speed and distance settings.

The rotation speed determines how quickly the nibs appear to rotate around the centre point as the centre point is moved. The rotation speed may be a whirl rate which is constant during a brush stroke. The whirl rate is added to the current angle of each nib for each new centre point position. The rotation speed may also be varied during a brush stroke.

The distance settings may include grow settings, such as a grow rate or grow speed and a grow scale or grow amount.

The grow rate is a value determining how quickly the radius will be adjusted to give the dabs the appearance of growing and shrinking as the centre point is moved.

The grow scale is a value determining how much of the grow rate is actually applied to the brush stroke. When the grow scale is zero, there is no effect of the grow rate; and when it is the maximum value, there is a full effect of the grow rate.

Thus, the distance from the cursor to each nib is controlled by the initial position values and modified by the grow settings. For this distance control, the system may use a distance cycle as an accumulator during a brush stroke, for animating the distance based on the grow rate and grow scale.

The centre point may be turned on or off. When it is turned off, no dab is rendered at the centre point and dabs are rendered just at the additional nibs for a different effect.

The size of each nib may be also set together with the other variables.

When a brush stroke begins, it is preferable to reset the base angle and the distance cycle to a known value, respectively, so that each subsequent brush stroke begins the same way and it is replayed properly.

By controlling these variables, the user can control the appearance of resultant brush strokes.

Figure 5:
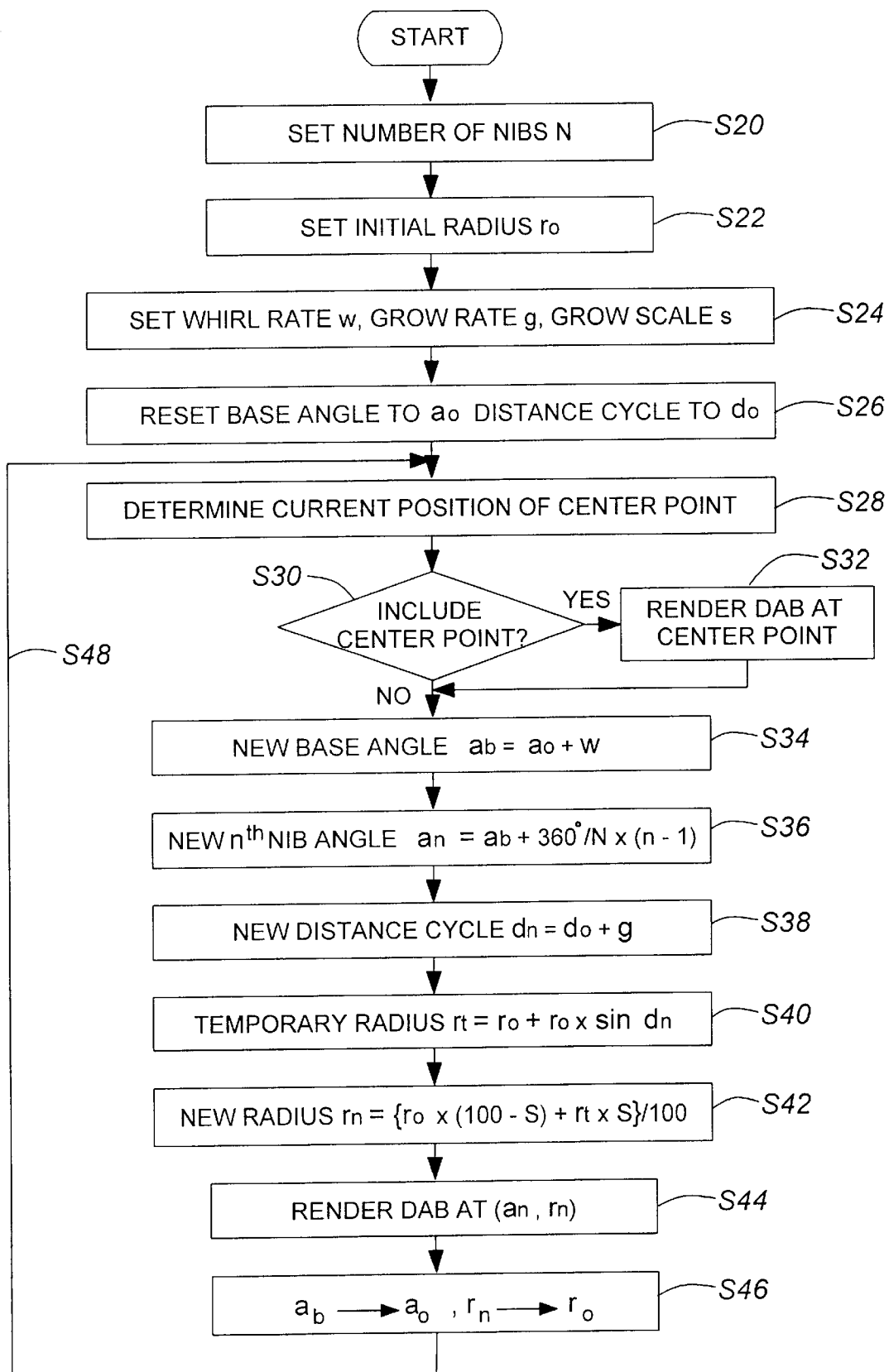
FIG. 5 is a flowchart showing another embodiment of the present invention.

FIG. 5 is a flowchart showing another embodiment of the present invention where all nibs have a same radius and a same angle difference between neighbouring nibs. Thus, the nibs are placed equidistantly in a circular pattern around a centre point.

Rendering a brush stroke on an electrical document starts by setting a number of nibs N (S20); an initial radius $r_0$ (S22); a whirl rate w, a grow rate g, and a grow scale s (S24). In this embodiment, the grow scale s takes a number from 0 through 100, where 0 causes no effect of the grow rate, and 100 causes a full effect of the grow rate.

A base angle is reset to a known value $a_0$, and a distance cycle is also reset to a known value $d_0$ (S26).

When a brush stroke begins, the brush stroke system determines, relative to the document, a current position of a centre point indicated by a cursor (S28). If inclusion of the centre point is enabled (S30), the system renders a dab at the determined current position of the centre point (S32).

The system then calculates each new nib angle and a new radius to determine a new position of each nib.

In order to determine each new nib angle, a new base angle $a_b$ is calculated by adding the whirl rate w to the base angle $a_0$ (S34).

$$a_b = a_0 + w$$

New nib angles are calculated by adding 360°/N to the base angle for each successive nib, wherein N is the number of nibs. That is, new nth nib angle $a_n$ is calculated by:

$$a = a_b + 360°/N \times (n-1)$$

wherein n is a integer between 1 to N (S36).

In order to determine a new radius $r_n$, a new distance cycle $d_n$ is calculated by adding the grow rate g to the distance cycle $d_0$ (S38).

$$d_n = d_0 + g$$

Then, a temporary radius $r_t$ is calculated by multiplying the original radius $r_0$ by the sine of the new distance cycle $d_n$, and adding the obtained value to the original radius $r_0$ (S40).

$$r_t = r_0 + r_0 \times \sin d_n$$

As the distance cycle changes with each successive centre point move, this causes the temporary radius to cycle from zero through to double the original radius and back to zero in a smooth sine curve.

The new radius $r_n$ is calculated by multiplying the original radius $r_0$ by the (100-grow scale s), multiplying the temporary radius $r_t$ by the grow scale s, adding these two values, and dividing by 100 (S42).

$$r_n = \{r_0 \times (100-s) + r_t \times s\}/100$$

This scales the amount of the radius variance by the grow scale value.

Then, the system renders a dab for each nib, at the computed new nib angles $a_n$ and at the new radius $r_n$ (S44).

The original base angle $a_0$ and the original radius $r_0$ are replaced by new base angles $a_b$ and the new radius $r_n$, respectively, for calculation of next nib positions (S46).

The steps of S28 to S46 are repeated until the brush stroke is terminated (S48).

Figure 6:
FIG. 6 is an example of a normal brush stroke.

FIG. 6 shows a normal brush stroke having no nibs added to a centre point.

FIGS. 7–10 are brush strokes rendered by the embodiment of the present invention shown in FIG. 5.

Figure 7:
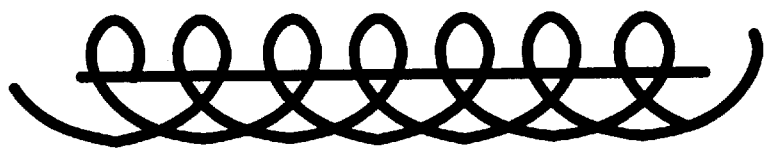
FIG. 7 is an example of a brush stroke rendered in accordance with the embodiment of the present invention shown in FIG. 5.

The brush stroke shown in FIG. 7 is rendered with two nibs, an initial radius of 25 pixels, a whirl rate of 5 degrees per step. A grow rate and a grow scale are set to zero.

Figure 8:
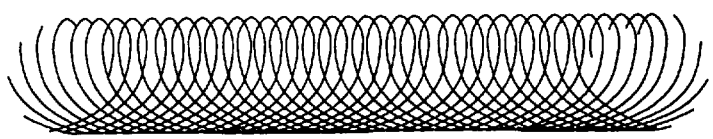
FIG. 8 is an example of a brush stroke rendered in accordance with the embodiment of the present invention shown in FIG. 5.

The brush stroke shown in FIG. 8 is rendered with the same settings as FIG. 7, except for the inclusion of the centre point.

Figure 9:
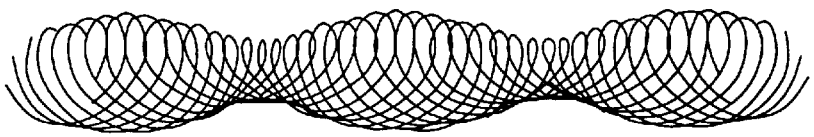
FIG. 9 is an example of a brush stroke rendered in accordance with the embodiment of the present invention shown in FIG. 5.

FIG. 9 shows a brush stroke using 10 nibs of smaller nib seize. The other settings are the same as FIG. 7.

In FIG. 10, a grow amount is set to 50 system units and a grow speed is set to 20%. Other than those settings, the brush stroke of FIG. 10 is rendered with the same settings as FIG. 9.

While particular embodiments of the present invention have been shown and described, changes and modifications may be made to such embodiments without departing from the true scope of the invention.

For example, the present invention may be also implemented by a computer processor or similar device programmed to execute the method steps described above, or may be executed by an electronic system which is provided with means for executing these steps.

The present invention also covers a computer readable memory, such as computer diskettes, CD-ROMs, Random Access Memory (RAM) and Read Only Memory (ROM), which stores statements or instructions for use in the execution of the method steps in a computer. As well, electronic signals representing these method steps may also be transmitted via a communication network. Such electronic signals are also within the scope of the present invention.

What is claimed is:

1. A method for rendering a brush stroke on an electrical document, the method comprising the steps of:
   (a) setting a number of nibs to be rendered in the brush stroke;
   (b) setting initial position values determining an initial position of each nib relative to a center point;
   (c) setting movement variables representative of movement of each nib relative to the centre point to a value other than zero;
   (d) determining a current position of the centre point relative to the document;
   (e) calculating a new position for each nib, relative to the current position of the centre point, based on the initial position values and the movement variables;
   (f) rendering a dab at the new position of each nib; and
   (g) repeating the steps (d) to (f) while the centre point is being moved so as to render the brush stroke.

2. A method as claimed in claim 1 wherein the step (b) comprises the step of setting initial position values so as to arrange the nibs in a circular pattern around the central point.

3. A method as claimed in claim 2 wherein by the step of setting initial position values, the nibs are arranged equidistantly in the circular pattern.

4. A method as claimed in claim 1 wherein the step (b) comprises the step of setting an initial angle of each nib around the centre point.

5. A method as claimed in claim 1 wherein the step (b) comprises the step of setting a radius which determines how far from the centre point each nib is initially placed.

6. A method as claimed in claim 5 wherein the step (c) comprises the step of setting a grow rate which determines how quickly the radius will be adjusted to give the appearance of growing and shrinking as the centre point is moved.

7. A method as claimed in claim 6 wherein the step (c) further comprises the step of setting a grow scale which determines how much of the grow rate is actually applied to the stroke.

8. A method as claimed in claim 7 wherein the step (c) further comprises the step of initializing a distance cycle to a predetermined value, the distance cycle is an accumulator during the brush stroke so as to animate the distance based on the grow rate and grow scale.

9. A method as claimed in claim 1 wherein the step (c) comprises the step of setting movement variable values so as to rotate each nib around the centre point.

10. A method as claimed in claim 9 wherein the step (c) comprises the step of setting a whirl rate which determines how quickly each nib appears to rotate around the centre point as the centre point is moved.

11. A method as claimed in claim 1 further comprising the step of setting inclusion or exclusion of the centre point to render a dab at the current position of the centre point.

12. A brush stroke rendering system for rendering a brush stroke on an electrical document, the system comprising:
   initial setting means for setting a number of nibs to be rendered in the brush stroke,
   initial position values determining an initial position of each nib relative to a centre point, and movement variables representative of movement of each nib relative to the centre point;
   centre point position determining means for determining a current position of the centre point relative to the document;
   nib position calculating means for calculating each nib position, relative to the current position of the centre point determined by the centre point position determining means, based on the initial position values and the movement variables; and
   a display controller for rendering a dab at each nib position calculated by the nib position calculated means.

13. A brush stroke rendering system as claimed in claim 12 wherein the initial setting means comprises means for setting initial position values so as to arrange the nibs in a circular pattern around the central point.

14. A brush stroke rendering system as claimed in claim 13 wherein means for setting initial position values arranges the nibs equidistantly in the circular pattern.

15. A brush stroke rendering system as claimed in claim 12 wherein the initial setting means comprises means for setting an initial angle of each nib around the centre point.

16. A brush stroke rendering system as claimed in claim 12 wherein the initial setting means comprises means for setting a radius which determines how far from the centre point each nib is initially placed.

17. A brush stroke rendering system as claimed in claim 16 wherein the initial setting means further comprises means for setting a grow rate which determines how quickly the radius will be adjusted to give the appearance of growing and shrinking as the centre point is moved.

18. A brush stroke rendering system as claimed in claim 17 wherein the initial setting means further comprises means for setting a grow scale which determines how much of the grow rate is actually applied to the stroke.

19. A brush stroke rendering system as claimed in claim 18 wherein the initial setting means further comprises means for initializing a distance cycle to a predetermined value, the distance cycle is an accumulator during the brush stroke so as to animate the distance based on the grow rate and grow scale.

20. A brush stroke rendering system as claimed in claim 12 wherein the initial setting means comprises means for setting movement variable values so as to rotate each nib around the centre point.

21. A brush stroke rendering system as claimed in claim 20 wherein the initial setting means further comprises means for setting a whirl rate which determines how quickly each nib appears to rotate around the centre point as the centre point is moved.

22. A brush stroke rendering system as claimed in claim 12 wherein the initial setting means comprises means for setting inclusion or exclusion of the centre point to render a dab at the current position of the centre point.

23. A method for rendering a brush stroke on an electrical document, the method comprising the steps of:
   (a) setting a number of nibs to be rendered in the brush stroke;
   (b-1) setting an initial radius of the nibs relative to the centre point;
   (b-2) setting an initial base angle which determines an initial angle of a first nib relative to a centre point;
   (c-1) setting a rotation speed which determines how quickly each nib appears to rotate around the centre point as the centre point is moved;
   (c-2) setting distance variables which determine distance changes of the nibs from the centre point as the centre point is moved, wherein at least one of the rotation speed and the distance variables are set to a value other than zero;
   (d) determining a current position of the centre point relative to the document;
   (e-1) calculating a new base angle based on the initial base angle and the rotation speed;
   (e-2) calculating a new nib angle for each nib based on the new base angle and the number of the nibs;
   (e-3) calculating a new radius based on the initial radius and the distance variables;
   (f) rendering a dab at a new position of each nib determined based on the new nib angle and the new radius relative to the current position of the centre point; and
   (g) repeating the steps (d) to (f) while the centre point is being moved so as to render the brush stroke.

24. A method as claimed in claim 23 wherein the step (c-2) comprises the step of setting a grow rate which determines how quickly the radius will be adjusted to give the appearance of growing and shrinking as the centre point is moved.

25. A method as claimed in claim 24 wherein the step (c-2) further comprises the step of setting a grow scale which determines how much of the grow rate is actually applied to the stroke.

26. A method as claimed in claim 25 wherein the step (c-2) further comprises the step of initializing a distance cycle to a predetermined value, the distance cycle is an accumulator during the brush stroke so as to animate the distance based on the grow rate and grow scale.

27. A method as claimed in claim 23 wherein the step (c-1) comprises the step of setting a whirl rate at which each nib rotates around the centre point as the centre point is moved.

28. A method as claimed in claim 23 wherein the step (b-2) comprises the step of setting the initial base angle to a known value.

29. A method as claimed in claim 23 further comprising the step of setting inclusion or exclusion of the centre point to render a dab at the current position of the centre point.

30. A method for rendering a brush stroke on an electrical document, the method comprising the steps of:
   (a) setting a number of nibs to be rendered in the brush stroke;
   (b-1) setting an initial radius of the nibs relative to the centre point;
   (b-2) initializing a base angle to a predetermined value, the base angle determining an initial angle of a first nib relative to a centre point;
   (c-1) setting a whirl rate at which each nib rotates around the centre point as the centre point is moved;
   (c-2) setting a grow rate which determines how quickly the radius will be adjusted to give the appearance of growing and shrinking as the centre point is moved, wherein at least one of the rotation speed and the distance variables are set to a value other than zero;

(c-3) setting a grow scale which determines how much of the grow rate is actually applied to the stroke;

(c-4) initializing a distance cycle to a predetermined value, the distance cycle being an accumulator during the brush stroke so as to animate the distance based on the grow rate and grow scale;

(d) determining a current position of the centre point relative to the document;

(e-1) calculating a new base angle by adding the whirl rate to the initial base angle;

(e-2) calculating a new nib angle for each nib by adding to the base angle value a value calculated by dividing 360° by the number of the nib;

(e-3) calculating a new radius based on the initial radius and the distance variables by:

(e-3-1) adding a grow rate value to the distance cycle;

(e-3-2) calculating a temporary radius by multiplying the original radius by the sine of the distance cycle, so that as the distance cycle changes with each successive mouse move;

(e-3-3) calculating a final radius by multiplying the original radius by the value calculated by 100 minus the grow scale, multiplying the new radius, by the grow scale, adding these two values, and dividing by 100, so as to scale the amount of the radius variance by the grow scale value; and (f) rendering a dab at a new position of each nib determined based on the new nib angle and the final radius relative to the current position of the centre point; and (g) replacing values of initial base angle and initial radius by the new base angle and the final radius respectively; and (h) repeating the steps (d) to (g) while the centre point is being moved so as to render the brush stroke.

31. A computer readable memory element storing the instructions or statements for use in the execution in a computer of a method for rendering a brush stroke on an electrical document, the method comprising the steps of:

(a) setting a number of nibs to be rendered in the brush stroke;

(b) setting initial position values determining an initial position of each nib relative to a centre point;

(c) setting movement variables representative of movement of each nib relative to the centre point to a value other than zero;

(d) determining a current position of the centre point relative to the document;

(e) calculating a new position for each nib, relative to the current position of the centre point, based on the initial position values and the movement variables;

(f) rendering a dab at the new position of each nib; and (g) repeating the steps (d) to (f) while the centre point is being moved so as to render the brush stroke.

32. Electronic signals for use in the execution in a computer of a method for rendering a brush stroke on an electrical document, the method comprising the steps of:

(a) setting a number of nibs to be rendered in the brush stroke;

(b) setting initial position values determining an initial position of each nib relative to a centre point;

(c) setting movement variables representative of movement of each nib relative to the centre point to a value other than zero;

(d) determining a current position of the centre point relative to the document;

(e) calculating a new position for each nib, relative to the current position of the centre point, based on the initial position values and the movement variables;

(e) rendering a dab at the new position of each nib; and (g) repeating the steps (d) to (f) while the centre point is being moved so as to render the brush stroke.

* * * * *

UNITED STATES PATENT AND TRADEMARK OFFICE
CERTIFICATE OF CORRECTION

PATENT NO. : 6,195,100 B1
DATED : February 27, 2001
INVENTOR(S) : Steve Tibbett

It is certified that error appears in the above-identified patent and that said Letters Patent is hereby corrected as shown below:

<u>Column 10, claim 32,</u>
Line 37, change "(e)" to -- (f) --.

Signed and Sealed this

Nineteenth Day of March, 2002

Attest:

JAMES E. ROGAN
*Director of the United States Patent and Trademark Office*

*Attesting Officer*